(12) United States Patent
Cetiner

(10) Patent No.: US 8,840,979 B2
(45) Date of Patent: Sep. 23, 2014

(54) T-PROFILE JUNCTION OF COMPOSITE MATERIALS

(75) Inventor: Ahmet-Ender Cetiner, Augsburg (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 236 days.

(21) Appl. No.: 13/487,754

(22) Filed: Jun. 4, 2012

(65) Prior Publication Data

US 2012/0315431 A1    Dec. 13, 2012

(30) Foreign Application Priority Data

Jun. 10, 2011  (EP) .................................... 11400034

(51) Int. Cl.
| | |
|---|---|
| B32B 3/06 | (2006.01) |
| B32B 3/26 | (2006.01) |
| B64C 1/06 | (2006.01) |
| F16B 5/02 | (2006.01) |
| B64C 1/12 | (2006.01) |
| B64C 1/00 | (2006.01) |

(52) U.S. Cl.
CPC .................. B64C 1/061 (2013.01); B64C 1/064 (2013.01); *B64C 2001/0072* (2013.01); *F16B 5/02* (2013.01); *Y02T 50/43* (2013.01); *B64C 1/12* (2013.01); *Y02T 50/433* (2013.01)
USPC ......................................................... 428/119

(58) Field of Classification Search
CPC ........................ B64C 1/064; B64C 2001/0072
USPC ...................... 428/119, 137; 244/131; 52/838
See application file for complete search history.

(56) References Cited

U.S. PATENT DOCUMENTS

| | | | |
|---|---|---|---|
| 4,909,659 | A | 3/1990 | Anderson |
| 4,966,802 | A | 10/1990 | Hertzberg |
| 2006/0243860 | A1 | 11/2006 | Kismarton |

FOREIGN PATENT DOCUMENTS

| | | |
|---|---|---|
| EP | 1194285 B1 | 5/2004 |
| EP | 2021164 A1 | 2/2009 |

OTHER PUBLICATIONS

Search Report and Written Opinion; Application No. EP 11400034; dated Dec. 14, 2011.

*Primary Examiner* — Alexander Thomas

(74) *Attorney, Agent, or Firm* — Brooks Kushman P.C.

(57) ABSTRACT

A T-profile junction of composite materials with a T-profile (1) and a base plate (2). The T-profile (1) comprises a web (3) and at least two flanges (4-7). The flanges (4-7) are angled with respect to the web (3). A fillet (11, 12) is provided between the web (3) and each of the flanges (4-7). At least one tension bar (16, 32, 40, 50, 65) is releasably mounted to the base plate (2). The web (3) is provided with at least one passage (23, 24, 33, 34). Said at least one tension bar (16, 32, 40, 50, 65) reaches through the at least one passage (23, 24, 33, 34). The at least one tension bar (16, 32, 40, 50, 65) is biased against the base plate (2) and the respective flanges (5, 6) of said T-Profile (1).

20 Claims, 5 Drawing Sheets

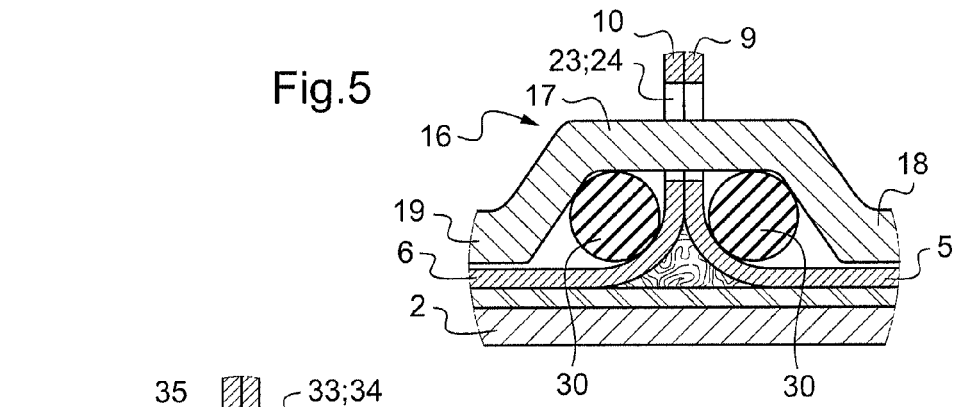
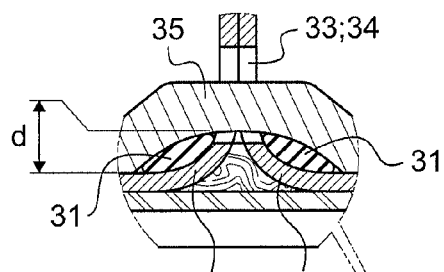
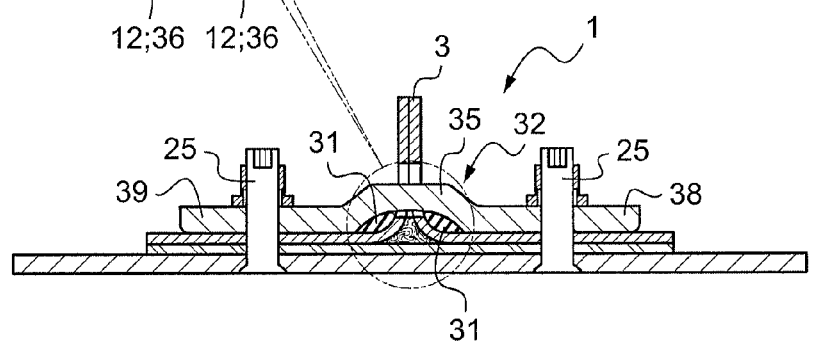
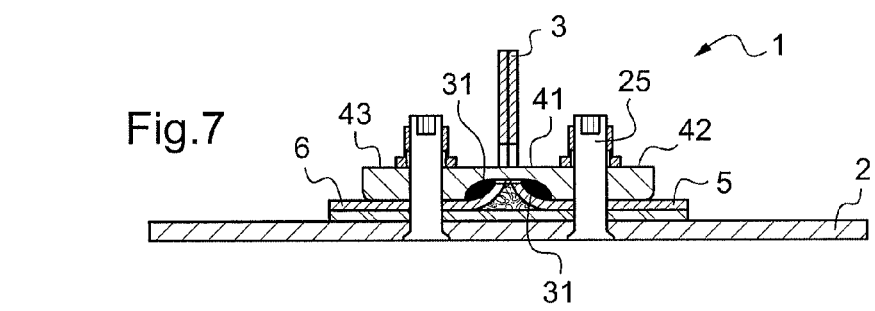
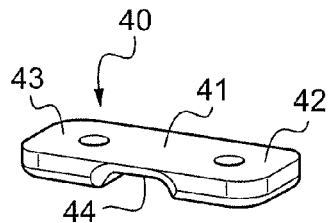

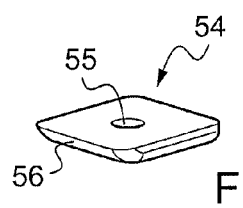
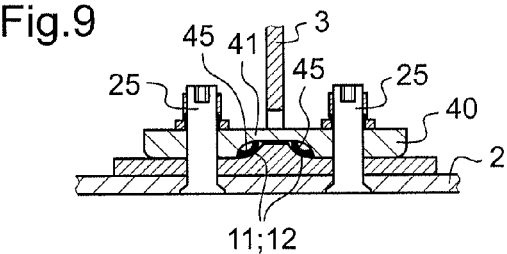
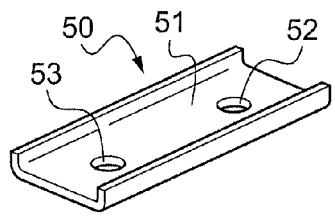
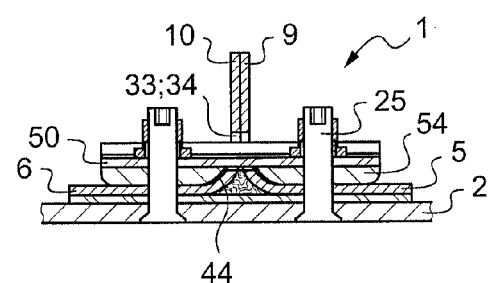
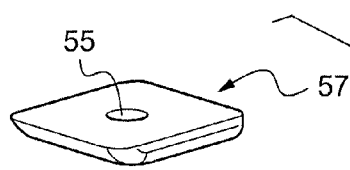
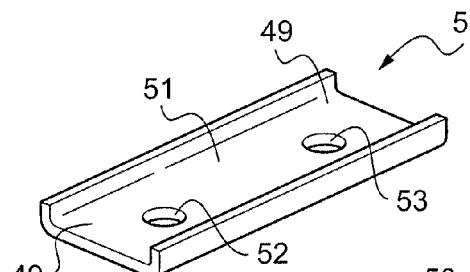
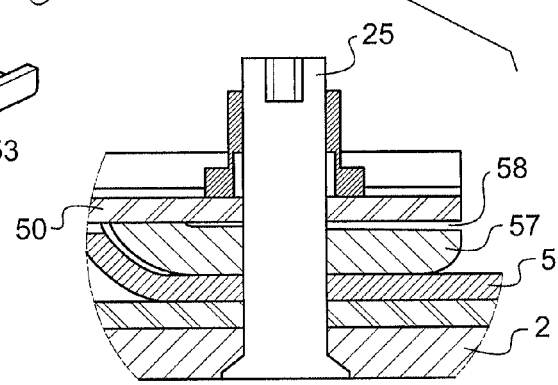

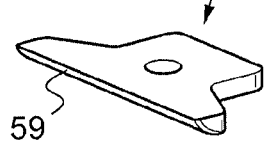
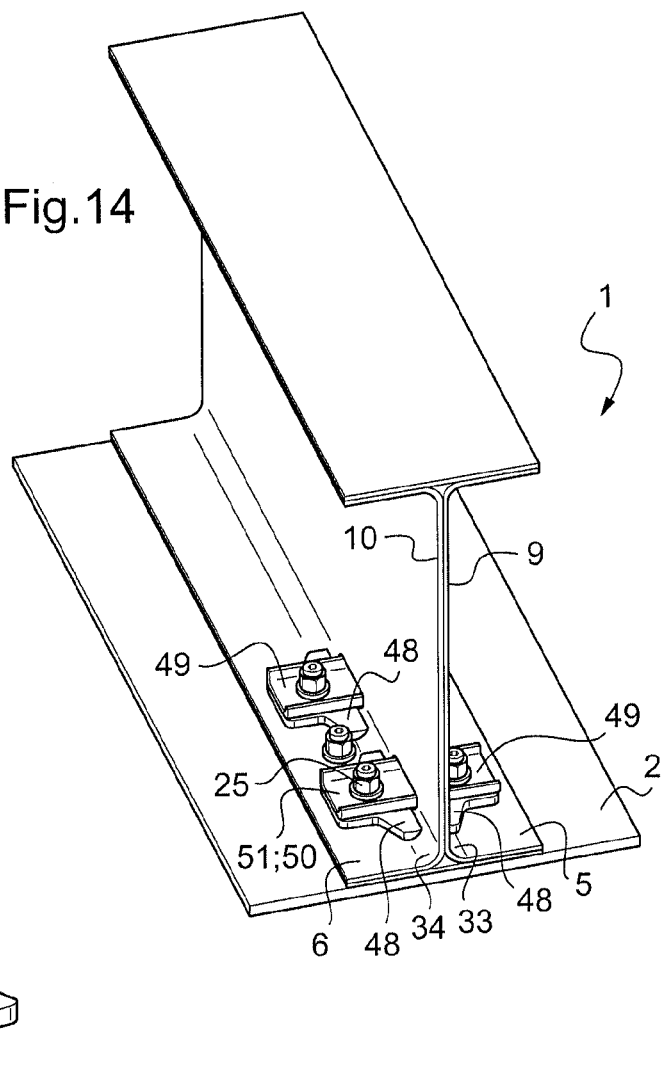
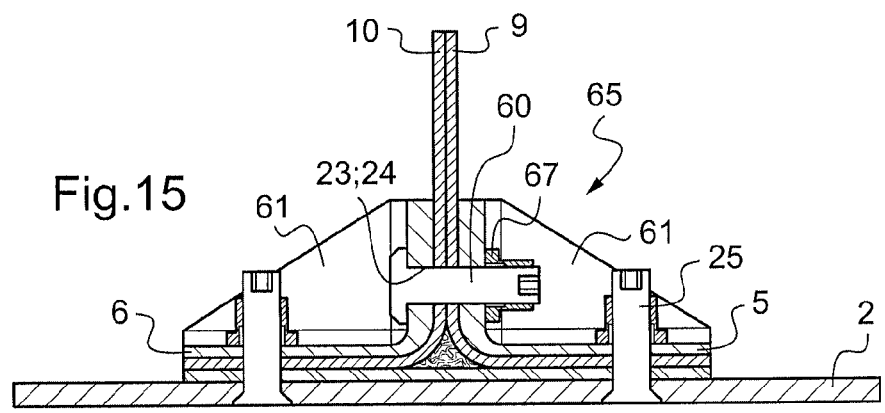

T-PROFILE JUNCTION OF COMPOSITE MATERIALS

CROSS REFERENCE TO RELATED APPLICATIONS

This application claims priority to European application no. 11 400034.2 filed on Jun. 10, 2011, the disclosure of which is incorporated in its entirety by reference herein.

BACKGROUND OF THE INVENTION (1) Field of the Invention

The invention relates to a T-profile junction of composite materials. The junctions are used in the field of airplane airframe composite structures.

(2) Background Art

Aircrafts of 21st century make use of composite materials in their structural design as much as possible. But there are limitations due to the nature of composite materials making it impossible to use composite parts at some occasions. The so called "T-Pull problem", where T refers to the profile of the composite part, is one of the above mentioned limitations, and because of the T-Pull problem some composite parts have to be designed unnecessarily heavy or in some cases have to be replaced by metallic parts making the parts even heavier.

The T-Pull problem is caused by the lack of "out of plane capabilities" of common composite materials. Composites differ from metals as their properties are not uniform in all directions. Especially the short transverse strength of composite materials is poor. For parts loaded in a direction out of plane the thickness stresses are inevitable and metallic materials are superior to composites for said applications. For the above reason, when using composite materials, conventional metallic designs of structures are altered to avoid out of plane stresses in the structure. But there are still cases for which changing the design geometry to avoid out of plane stresses conflict with functional requirements of the structure. Whenever a T/Junction exists in a composite part (I section, T section), the pulling load and the resulting resisting forces at flanges of a T-profile junction cause out of plane stresses/strains in the composite structure around the T-profile junction. These stresses can not be handled by composite materials, hence leading to the failure of the junction. The failure generally shows itself as delamination between C shaped web ply packages and any triangular filler at the T-profile junction. Delamination can also occur between lower cap ply package and filler as well. In both of the above cases, delamination continues between the web ply packages and cap ply packages, splitting the T section into 2 C section parts connected at the web. Those C sections, which encounter extreme deformation, against which they are not sized for, also develop delamination within the laminate leading to complete failure of the part.

The problem can not be solved by simply adding extra composite material. The amount of extra plies to be added usually would be as much that the composite material can be replaced by a metal. Said solution is absolutely ineffective, since the amount of composite material to be added is not linearly linked to the increase in stiffness. Even for some cases adding as much as possible composite material in given space does not solve the problem.

Consequently some previously developed composite aircraft structures with T-profile junctions are supported by metallic parts, when possible, such supports being L shaped brackets or square tension bars to support the flanges as shown in FIG. 1 of the attached drawings. If the space given is limited, brackets or tension bars can not be used.

The document EP1194285B1 discloses a fiber composite material with reduced delamination, said composite itself being modified to make it more delamination resistant with the consequence that no conventional composite materials may be used.

The document U.S. Pat. No. 4,966,802 discloses fibre reinforced resin composites formed by elements joined by a high shear strength, high fracture toughness adhesive. The elements are created in easy to produce cross-sectional shapes such as flat, C-shaped, Z-shaped or T-shaped. When joint, the elements form delamination resistant fibre reinforced resin composites having more complex shapes. The strength of the junctions between a pair of elements, such as a panel and its associated reinforcing members, can be enhanced by fasteners, such as rivets, if desired. Said state of the art is not specific to structures with T or I cross-section which are subject to pull loads such as typical spars, ribs on composite wings, stringers on pressure bulkheads, frames on landing gear bays and frames on cargo & passenger doors.

The document EP2021164A1 is dealing with the problem of delamination when a laminated element has a curve formed therein. An apparatus is disclosed for and a method of compressing a curved region of a laminated element or structure so as to protect the element or structure against delamination. Said state of the art is applicable to single laminates with L or C sections, where it is possible to compress the laminate from both surfaces, namely at the corner where it is most subject to delamination and to counteract out of plane loads. Said state of the art is not applicable to T-sectioned composite parts. Said state of the art does not counteract the main loading on the part, which causes the delamination, but only counteracts internal loads.

The document U.S. Pat. No. 4,909,659 A discloses projections formed in a wing skin to mate with recesses formed in a support substructure which, when positioned together, form interdigitations which prevent sliding displacement of the wing skin. A plurality of sliding bars transversely pass through the interdigitating sections to maintain an interlocking relation. The transversely oriented bars enable the use with contoured wing skin structures.

The document US2006243860 A1 discloses a composite stringer and skin structures and methods for forming the same. In one embodiment, a composite stringer and skin structure includes a polymer-based elongated stringer portion having reinforcing fibers positioned in a plurality of adjacent plies, a first portion of the reinforcing fibers being oriented at a relatively shallow angle relative to a selected reference direction, and a second portion of the reinforcing fibers being oriented at a relatively broad angle relative to the selected reference direction. A polymer-based and fiber reinforced skin member adjoins the stringer portion, and an adhesive material is interposed between the stringer portion and the skin member.

BRIEF SUMMARY OF THE INVENTION

It is an object of the invention to provide a T-profile junction of composite materials with an improved resistance against delamination.

The solution is provided with a T-profile junction of composite materials with the features disclosed herein.

According to the invention a T-profile junction of composite materials comprises a T-profile and a base plate. Said T-profile comprises at least one web and two flanges, said flanges being angled with respect to said web. A fillet is provided between the web and each flange appendant to said web. Said base plate extends at least along most of the surface of the flanges opposite to the web. At least one tension bar comprises a bridge and at least one fixation opening towards each of its both ends, said at least one tension bar being releasable mounted to the base plate from the side of said respective flanges of the T-profile with at least one fastener through the fixation openings of the at least one tension bar. The web is provided with at least one passage and said at least one tension bar is reaching through said at least one passage. The at least one tension bar is biased against the base plate and the respective flanges of the T-profile by fasteners on either side of said web, said tension bar being adapted to act with biasing means to force the fillets towards the base plate. Any delamination forces in the inventive T-profile junction of composite materials are overcome by the bridging of opposed sides of the flanges by a tension bar fixed by two fasteners to the left and right of web. The at least one tension bar supplies the needed forces to support the inventive T-profile junction of composite materials at areas likely to fail due to any stresses in an "out-of plane" direction applying the principle of the invention by counteracting the out-of plane forces with a supporting element that stiffens the T section and uses forces from the fasteners holding the two flanges against the base plate of the T section. Thus according to the invention the pulling load is counteracted by transferring counter forces from the fasteners at the flanges to block from the beginning any deformations leading to delamination. Said counter forces are applied to the main delamination area, hence also avoiding still possible delaminations to stabilize the complete inventive T-profile junction of composite materials.

According to a preferred embodiment of the invention the flanges are essentially rectangular with respect to said web.

According to a further preferred embodiment of the invention the biasing means comprise essentially circular support rods between the tension bar and the fillets, namely essentially circular support rods on either side of the web that are parallel to the at least two flanges, in order to support the composite part near the fillet, where delamination and subsequent failure of a composite structure is most likely to occur.

According to a further preferred embodiment of the invention the essentially circular support rods have a diameter that is large enough to provide for a clearance between the tension bar and the flanges to prevent the tension bar from laying alongside the flanges for a fixation of the tension bar to the flanges under pre-tension. The said pre-tension will be established via elastic deformations of the tension bar or the support rods or both.

According to a further preferred embodiment of the invention the biasing means comprise unidirectional carbon support rods cured in place between the tension bar and the fillet to an essentially oval shape with improved adaption to the tension bar and the fillet and for smaller flange width.

According to a further preferred embodiment of the invention the biasing means comprise support rods made from spring steel with a geometry similar to a slotted pin spring or a leaf spring for pre-tensioned support.

According to a further preferred embodiment of the invention the biasing means comprise support pads, preferably tapered support pads, e.g. with varying thickness as a consequence of a tapered upper surface, such that when the pads, tension bars and flanges are joined by the fasteners, the support pads are pushed against the radius.

According to a further preferred embodiment of the invention the support pads extend beyond the cross section of the bridge to support the flanges even at the areas between two consecutive rows of fasteners and tension bars.

According to a further preferred embodiment of the invention the bridge of the tension bar is provided with biasing means to force support brackets towards the fillet.

According to a further preferred embodiment of the invention the passage is formed as a slot with rounded corners to avoid stress concentration, said slot being close to the fasteners carrying the pulling loads on the T junction.

According to a further preferred embodiment of the invention the tension bar is pretensioned through compression on the support rods/pads, said pre-tension being established via elastic deformations of the tension bar or the support rods/pads or both.

BRIEF DESCRIPTION OF THE SEVERAL VIEWS OF THE DRAWINGS

Preferred embodiments of the invention will be described more in detail with the following description and reference to the attached drawings.

FIG. 5 shows an enlarged cross sectional view of a second embodiment of the T-profile junction of composite materials according to the invention, FIG. 6 shows two cross sectional views of a third embodiment of the T-profile junction of composite materials according to the invention, FIG. 7 shows a cross sectional view of a fourth embodiment of the T-profile junction of composite materials according to the invention, FIG. 8 shows a perspective view of a tension bar of the fourth embodiment of the T-profile junction of composite materials according to the invention, FIG. 9 shows a cross sectional view of a fifth embodiment of the T-profile junction of composite materials according to the invention, FIG. 10 shows a perspective view of two elements of a six embodiment of the T-profile junction of composite materials according to FIG. 9 of the invention, FIG. 11 shows an enlarged cross sectional view of the sixth embodiment of the T-profile junction of composite materials according to the invention, FIG. 12 shows a perspective view of tension bridge elements of a seventh embodiment of the T-profile junction of composite materials and an enlarged a cross sectional view of a section of the seventh embodiment of the T-profile junction of composite materials according to the invention, FIG. 13, 14 show perspective views of an eighth embodiment of the T-profile junction of composite materials according to the invention, FIG. 15 shows a cross sectional view of a ninth embodiment of the T-profile junction of composite materials according to the invention.

DETAILED DESCRIPTION OF THE INVENTION

Figure 1:
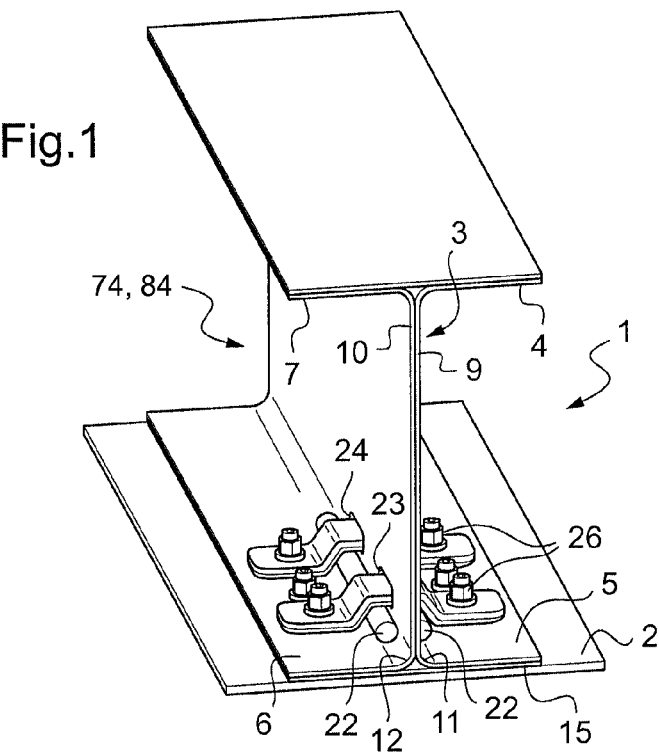
FIG. 1 shows a perspective view of a T-profile junction of composite materials according to the invention.
Figure 2:
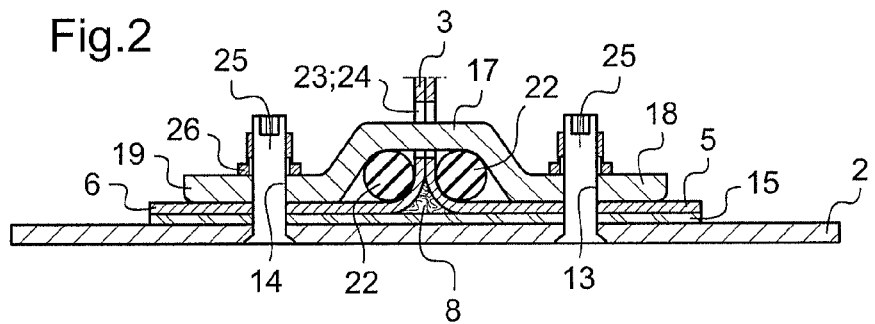
FIG. 2 shows a cross sectional view of the T-profile junction of composite materials according to FIG. 1 of the invention.

According to FIG. 1, 2 a T-profile junction of composite materials comprises a double T-profile 1 and a base plate 2. The T-profile 1 is a composite structure 74 in an airplane airframe 84. A web 3 with two flanges 4-7 at either side of the web 3 form said double T-profile 1. The flanges 4-7 are rectangular to the web 3. Fillets 11, 12 connect the flanges 4, 6 to the web 3. The flanges 4-7 with a cap ply package 15 and the web 3 have a thickness of about 3 mm each.

The T profile 1 comprises 2 web ply packages 9, 10, the cap ply package 15 and a filler 8 provided between the fillets 11, 12 and the cap ply package 15. After cure the web ply packages 9, 10 form the web 3 and the flanges 5, 6 are integral with the cap ply package 15.

Each of said respective flanges 5, 6 are provided with a through hole 13, 14 coaxial with said through hole 13, 14 in the base plate 2.

Figure 3:
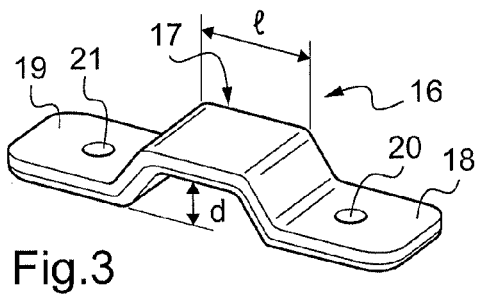
FIG. 3 shows a perspective view of a tension bar of the T-profile junction of composite materials according to FIG. 1 of the invention.
Figure 4:
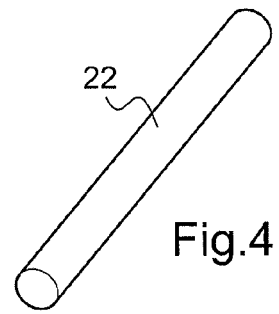
FIG. 4 shows a perspective view of a support rod of the T/I profile junction of composite materials according to FIG. 1 of the invention.

According to FIG. 3 corresponding features are referred to with the references of FIG. 1, 2. A tension bar 16 is provided with an essentially planar bridge 17 and two lateral supports 18, 19. The plane of the bridge 17 is offset with a distance d of approximately the same as the radius r of the fillets 11, 12 from the plane of the two lateral supports 18, 19. An upper surface of the bridge 17 has a length l of about two times the width of a web 3 plus two times the diameter of a support rod 22 (see FIG. 4), said diameter being adapted to the radius r of the fillets 11, 12 between web 3 and flanges 5, 6 and an inner curvature from the planar bridge 17 towards the two lateral supports 18, 19 of the tension bar 16. The radius of the support rod 22 is less than the radius r of the fillets 11, 12 and more than the inner radius of the transition from the bridge 17 towards any of the two lateral supports 18, 19 for a three points contact of the support rod 22 with the radius r of the fillets 11, 12 on one side and the opposed inner radius of the transition from the bridge 17 towards any of the two lateral supports 18, 19. Each of the two lateral supports 18, 19 are provided with a through hole 20, 21 corresponding to the through holes 13, 14 in the flanges 5, 6 and in the base plate 2.

The web 3 is provided with two separated passages 23, 24 right above the fillets 11, 12. Each of the passages 23, 24 have rounded corners.

Two individual tension bars 16 made of composite materials or metal are arranged with their respective bridges 17 through the two separated passages 23, 24 and with their through holes 20, 21 coaxial to the through holes 13, 14 in the flanges 5, 6 and in the base plate 2. A support rod 22 of composite materials or metal or metallic pipe is provided between each of the insides of the two tension bars 16 as biasing means and extends parallel alongside to each of the respective outsides of the fillets 11, 12 beyond the two tension bars 16. The thickness of the bridge 17 is about 4 mm. The diameter of the support rod 22 is about 7 mm. The bridges 17 are free with 0.5-1.0 mm from the lower border of the two passages 23, 24. The gap between the bridges 17 and the lower border of the two passages 23, 24 can be filled with liquid shim as load introduction means (not shown), when stress values expected are within acceptable limits.

The two individual tension bars 16 are mounted on top of said respective flanges 5, 6 with fasteners 25 through the through holes 13, 14 of the base plate 2 and said respective flanges 5, 6 of T-Profile 1. The through holes 13, 14 are phased at the outside of the base plate 2 to withhold the fasteners 25 against the tension exerted by a screw nut 26 from the tapped end of each of the fasteners 25 at the respective flanges 5, 6. When biasing with the fasteners 25 the tension bars 16 towards the respective flanges 5, 6 and the base plate 2, the two support rods 22 are pressed against the respective outsides of the fillets 11, 12 to counter any forces pulling along the plane of the web 3 away from the base plate 2 thus avoiding or reducing any bending moments created in the flanges 5, 6.

According to FIG. 5 corresponding features are referred to with the same references as in FIG. 1-4. A second embodiment of the T-profile junction of composite materials comprises support rods 30 with a diameter that is large enough to prevent the support plates 18, 19 of the tension bar 16 from laying alongside the flanges 5, 6 of the T-Profile 1 when the tension bar 16 is mounted through the passage 23, 24 and pressed with the fasteners 25 (not shown) towards the base plate 2. The clearance between the support plates 18, 19 and the flanges 5, 6 allows pre-tension of the bridge 17 to the support rods 30 as biasing means for improved retaining forces from the tension bars 16 to the fillets 5, 6 with the tension bar 16 having a spring-like function.

According to FIG. 6 corresponding features are referred to with the same references as in FIG. 1-5. A third embodiment of the T-profile junction of composite materials comprises support bars 31 that are cured in place over the already cured T-Profile 1. One tension bar 32 is mounted through each of the passages 33, 34 in the web 3 to press the support bars 31 as biasing means against the fillets 11, 12 and consequently the flanges 5, 6 towards the base plate 2 when the fasteners 25 are tightened. The shape of the support bars 31 is adapted to the inside of a bridge 35 and a segment 36 of the fillet 11, 12 said segment 36 reaching only through a part of the fillet 11, 12. The plane of the bridge 35 is offset with a distance d of less than the radius r of the fillets 11, 12 from those of the two lateral supports 38, 39.

According to FIG. 7, 8 corresponding features are referred to with the same references as in FIG. 1-6. A fourth embodiment of the T-profile junction of composite materials comprises the support bars 31 with a tension bar 40 as biasing means with one upper plane for the bridge 41 and the two lateral supports 42, 43 and a central recess 44 for mounting the tension bar 40 through the passage 33, 34 to press with the fasteners 25 the support bars 31 against the fillets 11, 12 of the T-Profile 1. The shape of the support bars 31 is adapted to the central recess 44 of the bridge 41 and the segment 36 of the fillet 11, 12. The bridge 41 is 10%-20% shorter than the bridge 35 and therefore safes space depending on the ratio between the size of the fasteners used and size of the tension bar 40.

According to FIG. 9 a fifth embodiment of the T-profile junction of composite materials comprises support bars 45 made of spring steel with a geometry similar to a slotted pin spring or a leaf spring adapted to the central recess 44 for pre-tensioned mounting of the tension bar 40 with the shorter bridge 41 through the passage 33, 34 in the web 3. The spring steel support bars 45 are pressed with the fasteners 25 against the fillets 11, 12 and act with the bridge 41 as biasing means to symmetrically preload the fillet 11, 12 and consequently the flanges 5, 6 towards the base plate 2.

According to FIG. 10, 11 corresponding features are referred to with the same references as in FIG. 1-9. A sixth embodiment of the T-profile junction of composite materials comprises a U-shaped tension bar 50 with one plane for the bridge 51 with two lateral supports with through holes 52, 53.

Two machined metallic support pads 54 with respective through holes 55 are provided with respectively rounded sides 56 adapted to the fillet 31, 12. The two machined metallic support pads 54 are essentially square shaped and mounted coaxially with their respective through holes 55 to the respective through holes 52, 53 in the lateral supports of the bridge 51 to form a central recess 44 at the U-shaped tension bar 50 for mounting the tension bar 50 through the passage 33, 34 to press the support pads 54 with the fasteners 25 against the T-profile 1.

According to FIG. 12 corresponding features are referred to with the same references as in FIG. 1-11. A seventh embodiment of the T-profile junction of composite materials comprises the U-shaped tension bar 50 manufactured by bending sheet metal with one plane for the bridge 51 and the two lateral supports 49 with through holes 52, 53. Two machined metallic support pads 57 with respective through holes 55 are provided with respectively rounded sides 56 adapted to the fillet 11. The two machined metallic support pads 57 are each tapered. The two tapered support pads 57 are mounted coaxially with their respective through holes 55 to the respective through holes 52, 53 of the lateral supports 49 of the bridge 51 to form a central recess 44 at the U-shaped tension bar 50 for mounting the tension bar 50 through the passage 33, 34 to press with the fasteners 25 the support pads 57 against the T-profile 1. The clearance 58 between the tapered support pads 57 and the tension bar 50 is directed away from the web 9, 10 and allows load shift along the support pads 57 from the tension bars 50 to the flanges 5, 6.

According to FIG. 13, 14 corresponding features are referred to with the same references as in FIG. 1-11. An eighth embodiment of the T-profile junction of composite materials comprises the U-shaped tension bar 50 with one plane for the bridge 51 and the two lateral supports 49 with the through holes 52, 53. Two machined metallic extended support pads 48 with respective through holes 55 are provided with respectively rounded extended sides 59 adapted to the fillet 31, 12. The two extended support pads 48 are mounted with their lateral extended sides 59 parallel and opposed to each other to form a central recess 44 at the U-shaped tension bar 50 for mounting the tension bar 50 through the passage 33, 34 to press with the fasteners 25 the support pads 48 against the T-profile 1. The extended sides 59 between and beyond the tension bars 50 support the fillets 33, 34 outside from the tension bars 50 and press the flanges 5, 6 towards the base plate 2.

Figure 16:
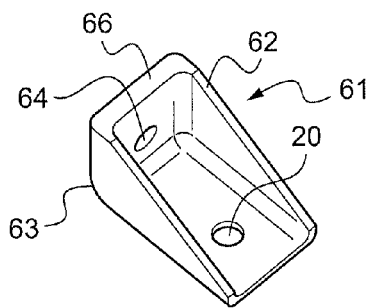
FIG. 16 shows a perspective view of a biasing means of the ninth embodiment of the T-profile junction of composite materials according to FIG. 15 of the invention.
Figure 17:
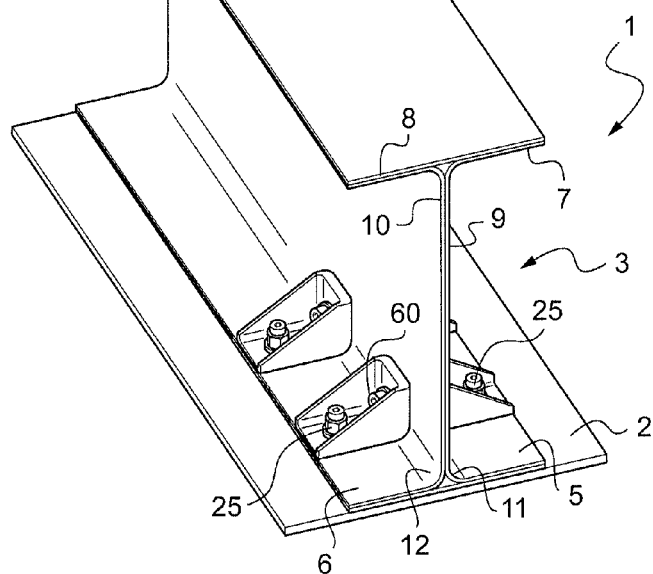
FIG. 17 shows a perspective view of the ninth embodiment of the T-profile junction of composite materials according to the invention and FIG. 18 shows a perspective view of a tenth embodiment of the T-profile junction of composite materials.

According to FIGS. 15, 16 and 17 corresponding features are referred to with the same references as in FIG. 1-14. A ninth embodiment of the T-profile junction of composite materials comprises the double T-profile 1 and the base plate 2. The web 3 of the respective flanges 5, 6 is provided with two separate passages as through holes 23, 24 right above the fillets 11, 12.

A bridge 60 of a tension bar 65 is conceived as a fastener as biasing means. Two shoe type support brackets 61 are each provided with two side ribs 62 and a back side 66 with an outer curvature 63 as elements of the tension bar 65 with bridge 60. The outer curvature 63 at said back sides 66 of the support brackets 61 are adapted to any of the fillets 11, 12 between the flanges 5, 6 and the web 9, 10. Each of the two support brackets 61 are provided with a through hole 64 in said back side 66 corresponding to the passage 23, 24 and a through hole 20, 21 corresponding to the through holes 13, 14 in the flanges 5, 6 and in the base plate 2. The bridge 60 is conceived to connect the respectively opposed back sides 66 of the support brackets 61 through the passages 23, 24 and the force of said back sides 66 to any of the fillets 11, 12 and the flanges 5, 6 may be biased by tightening a screw nut 67 of the bridge 60.

Two individual bridges 60 are tightened to press the respective back sides 66 of four support brackets 61 towards each other through the two separated passages 23, 24 and against the fillets 11, 12 and the flanges 5, 6. The two support brackets 61 are tightened by means of the fasteners 25 with their through holes 20, 21 coaxial to the through holes 13, 14 in the flanges 5, 6 and in the base plate 2. Each of the respective outer curvatures 63 of the two support brackets 61 per bridge 60 transfer the biasing forces of the bridges 60 to each of the respective outsides of the fillets 11, 12.

Figure 18:
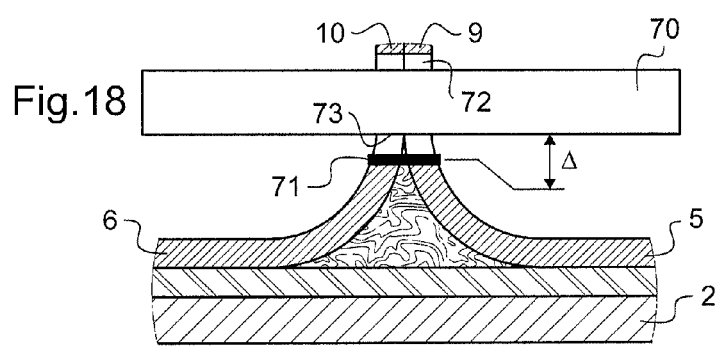

According to FIG. 18 corresponding features are referred to with the same references as in FIG. 1-17. A tenth embodiment of the T-profile junction comprises a tension bar with a bridge 70 conceived as a T-bridge. The bridge 70 extends through a passage 72 in the web 3. Said tension bar is mounted through flanges 5, 6 with fasteners (not shown) onto the base plate 2. Said respective flanges 5, 6 are connected via respective fillets 11, 12 to a web 3. The passage 72 is provided with a machined bearing surface 71 at the side of the passage 72 towards the base plate 2. Said bearing surface 71 has a distance A to the adjacent side of the bridge 70, said side of the bridge 70 comprising a lower central section 73 as biasing means. The distance A is defined to avoid direct contact between a trimmed surface of the bearing surface 71 and the lower central section 73. The distance A may be filled with liquid shim or any other appropriate load transfer medium to provide a support function supplemental to any support function of support rods/bars/pads.

What is claimed is:

1. A T-profile junction of composite materials comprising:
a T-profile and a base plate,
said T-profile comprising at least a web, and at least two flanges, each of said flanges being angled with respect to said web, a fillet being provided between each of the flanges and the web, said base plate extending at least along most of the surface of the flanges opposite to the web,
at least one tension bar comprising a bridge and at least one fixation opening towards at least one lateral support of said at least one tension bar, said at least one tension bar being releasably mounted to the base plate from the side of said respective web with at least one fastener through the at least one fixation opening of the at least one tension bar,
wherein the web is provided with at least one passage and said at least one tension bar is reaching through said at least one passage, the at least one tension bar being biased against the base plate and the respective flanges of said T-profile by fasteners on either side of said web, said tension bar providing a biasing means for forcing the fillets towards the base plate.

2. The T-profile junction according to claim 1, wherein the flanges are essentially rectangular with respect to said web.

3. The T-profile junction according to claim 1, wherein the biasing means further comprises essentially circular support rods positioned between the tension bar and the fillets on either side of the web.

4. The T-profile junction according to claim 3, wherein the essentially circular support rods have a diameter that is large enough to prevent the tension bar from resting over the flanges.

5. The T-profile junction according to claim 3, wherein the tension bar is pre-tensioned through compression on the support rods.

6. The T-profile junction according to claim 1, wherein the biasing means further comprises unidirectional carbon support rods cured in place over the fillet to an essentially oval shape.

7. The T-profile junction according to claim 1, wherein the biasing means further comprises support rods made from spring steel with a geometry of one of a slotted pin spring and a leaf spring for pre-tensioned support.

8. The T-profile junction according to claim 1, wherein the biasing means further comprises support pads.

9. The T-profile junction according to claim 8, wherein the support pads extend beyond the cross section of a bridge of the tension bar.

10. The T-profile junction according to claim 8, wherein the support pads are formed as square pad or as T-shaped pad on both flanges.

11. The T-profile junction according to claim 8, wherein the support pads are tapered support pads.

12. The T-profile junction according to claim 1, wherein the bridge is conceived as biasing means to force support brackets of the tension bar towards the fillets.

13. The T-profile junction according to claim 1, wherein the passage is formed as a slot with rounded corners to avoid stress concentration, said slot being on the web or partly on the web and partly on the fillet and near to the fasteners carrying pulling loads.

14. The T-profile junction according to claim 1, further comprising:
- support rods positioned between the tension bar and the fillets on either side of the web;
- wherein the biasing means further comprise support pads; and
- wherein the support rods and/or the support pads extend along more than one tension bar along the fillets, in order to support any free area between tension bars.

15. A T-profile junction of composite materials comprising:
- a composite T-profile having at least one web with an end region and at least two flanges angled with respect to the web, each flange connected to the end region of the web with a fillet, the web defining a through passage adjacent to the fillet;
- a base plate extending along a majority of a surface of the flanges opposed to the web; and
- a biasing mechanism comprising a tension bar having a bridge positioned between first and second lateral supports, each lateral support defining a fixation opening, wherein the tension bar extends through the through passage and is releasably mounted to the base plate using a fastener through each fixation opening of the tension bar;
- wherein the biasing mechanism is adapted to force the fillets towards the base plate when the tension bar is biased against the base plate and the respective flanges of the T-profile by fasteners through the fixation openings on either side of the web.

16. A T-profile junction according to claim 15, wherein the bridge of the tension bar is configured to provide a spring function when the tension bar is biased against the base plate and the respective flanges of the T-profile.

17. A T-profile junction according to claim 15, wherein the biasing mechanism further comprises first and second support rods, each rod positioned between a respective fillet and the tension bar on opposed sides of the web, the support rods configured to press against the fillets when the at least one tension bar is biased against the base plate.

18. A T-profile junction according to claim 17, wherein the through passage is a first through passage, and the tension bar is a first tension bar;
- wherein the web defines a second through passage spaced apart from the first through passage and adjacent to the fillet;
- wherein the biasing mechanism comprises a second tension bar extending through the second through passage and releasably mounted to the base plate; and
- wherein the first and second support rods extend between the first and second tension bars thereby supporting a region of the T-profile junction between the first and second through passages.

19. A T-profile junction according to claim 15, wherein the biasing mechanism further comprises first and second support pads, each support pad defining a through hole configured to receive one of the fasteners, each support pad positioned between a respective fillet and the tension bar on opposed sides of the web, the support pads configured to press against the fillets when the at least one tension bar is biased against the base plate.

20. A T-profile junction according to claim 19, wherein each of the first and second support pads has a rounded side adapted to mate with the fillet.

* * * * *